United States Patent [19]
Almen

[11] Patent Number: 5,181,573
[45] Date of Patent: Jan. 26, 1993

[54] SEED BED PACKER IMPLEMENT

[75] Inventor: Peter D. Almen, Devils Lake, N. Dak.

[73] Assignee: Summers Manufacturing Company, Inc., N. Dak.

[21] Appl. No.: 717,032

[22] Filed: Jun. 18, 1991

[51] Int. Cl.⁵ .............................................. A01B 29/04
[52] U.S. Cl. .................................... 172/459; 172/462; 172/500; 172/710
[58] Field of Search ............... 172/134, 149, 150, 170, 172/424, 459, 462, 497, 500, 532, 551, 710, 310, 311; 111/194, 195

[56] References Cited

U.S. PATENT DOCUMENTS

| | | | |
|---|---|---|---|
| 1,198,684 | 9/1916 | Waugh et al. | 172/170 |
| 2,975,844 | 3/1961 | Oehler et al. | 172/500 X |
| 3,097,705 | 7/1963 | Bopf | 172/710 |
| 3,240,508 | 3/1966 | Clausen et al. | |
| 3,480,086 | 11/1969 | Groenke | 172/710 |
| 4,004,640 | 1/1977 | Bland | |
| 4,116,140 | 9/1978 | Anderson et al. | |
| 4,245,706 | 1/1981 | Dietrich, Sr. | |
| 4,321,971 | 3/1982 | Hake et al. | 172/710 |
| 4,446,925 | 5/1984 | Vachon | 172/149 X |
| 4,519,460 | 5/1985 | Gust | 172/310 X |
| 4,646,850 | 3/1987 | Brown et al. | |
| 4,903,782 | 2/1990 | McClelland | |
| 4,993,499 | 2/1991 | Bourgault et al. | 172/311 X |

FOREIGN PATENT DOCUMENTS

| | | | |
|---|---|---|---|
| 0010076 | 4/1980 | European Pat. Off. | 172/149 |
| 8705777 | 10/1987 | PCT Int'l Appl. | 172/462 |

OTHER PUBLICATIONS

Ford Field Cultivator Sales brochure, p. 15, Sep. 1972.
"The SBC Cultivating System," Sales Brochure, Kongskilde Co., Jan. 1979.
Midwest Industries, Inc. Brochure, Midwest Lift Harrow, For Field Cultivators, Chisel Plows.

Primary Examiner—Randolph A. Reese
Assistant Examiner—Jeffrey L. Thompson
Attorney, Agent, or Firm—Merchant, Gould, Smith, Edell, Welter & Schmidt

[57] ABSTRACT

A drawbar packer having an adjustable bias assembly which transfers implement weight between the wheels and the coil packers. Tension on extension springs is adjustable so that sufficient weight is transferred from the wheels to the coil packers such that the wheels pack soil less than the coil packers. In this way, the implement packs soil uniformly in preparation of the seed bed.

1 Claim, 4 Drawing Sheets

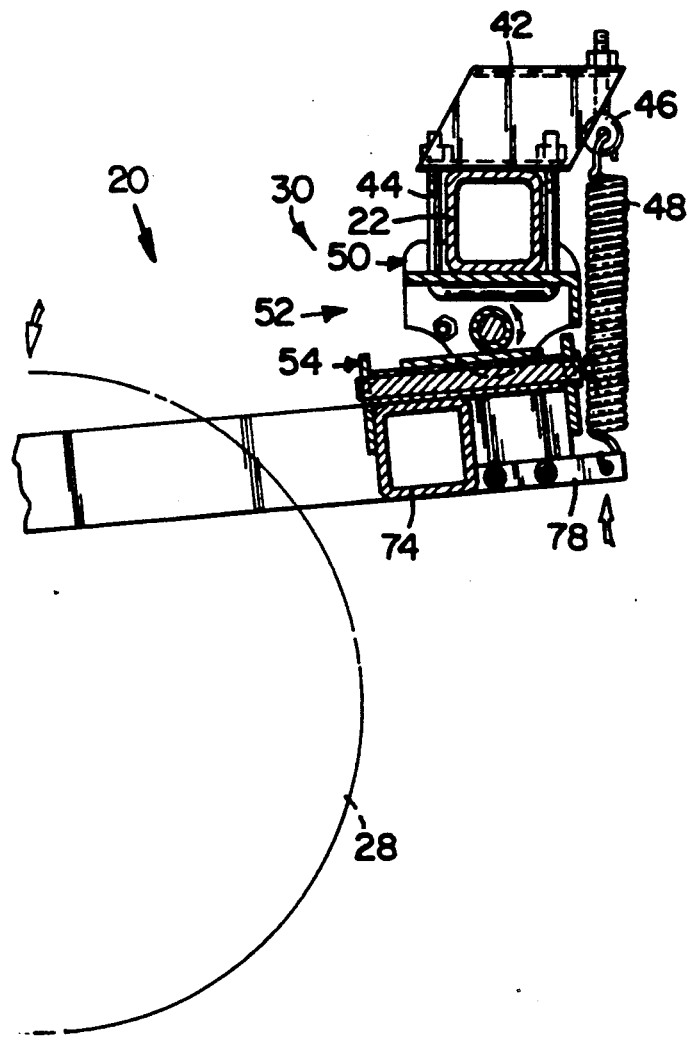

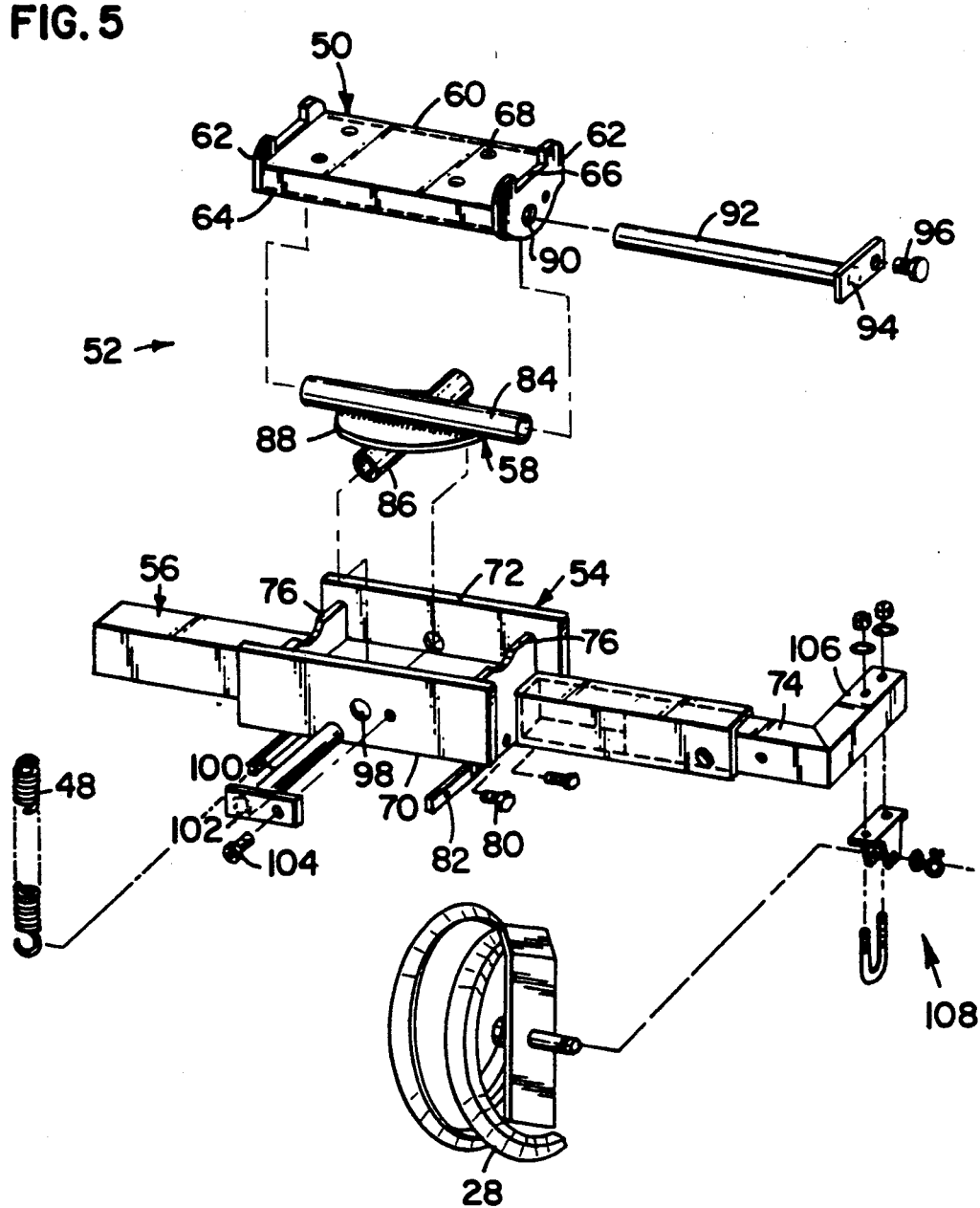

SEED BED PACKER IMPLEMENT

FIELD OF THE INVENTION

The invention is directed to agricultural implements, particularly, implements having packer tools intended to achieve a uniform packing of a bed of soil for subsequent planting or to achieve uniform packing of a bed of soil after it has been planted.

BACKGROUND OF THE INVENTION

Known packer implements have a frame with a hitch so that they can be towed behind a tractor or other implement. The frame is supported by wheels and includes a tool bar to which packer tools are connected. The problem with present packer implements is that most of the weight of the implement rests on the wheels with a lesser amount of weight resting on individual packer tools so that the wheels pack loose soil much more substantially than the packer tools. Hence, when a crop is planted, discontinuities in growth are apparent due to the soil packing differences.

Non-packer implements are known wherein hydraulic cylinders depress or retract the transport wheels so that more or less weight is placed on the implement soil working tool. U.S. Pat. No. 4,245,706 is exemplary of this concept.

Grain drills have tools for opening a furrow for receiving seed and are known to have press wheels therebehind for compacting the soil covering the seed. The press wheels may have an individual mechanism for adjusting the compacting force applied by the press wheel. U.S. Pat. No. 4,116,140 is exemplary of this concept.

U.S. Pat. No. 3,240,508 discloses a potato planter which has outer sections and spring mechanism between the central and outer sections for transferring weight therebetween.

None of the known art, however, addresses the problem of relieving weight from the wheels to achieve preparation of a uniformly packed seed bed and, consequently, of a packer implement which is capable of achieving that result.

SUMMARY OF THE INVENTION

The present invention is thus directed to an agricultural implement adapted for connection to a towing vehicle for forward movement over soil wherein the implement includes a frame with a wheel operably connected to it and also with a tow bar adapted for connection to the towing vehicle. The wheel supports weight of the implement. The frame also includes a tool bar. In contradistinction with the art, the implement then has mechanism for achieving uniform soil packing. The soil packing mechanism includes spiral-formed coil packers and mechanism for operably connecting the packers to the tool bar such that the connecting mechanism includes mechanism for transferring wheel supported weight from the wheel to the packers. In this way, the weight on the wheels is relieved so that soil behind the packers achieves a packing which is uniform regardless of whether the wheel went over it or not.

The present implement advantageously provides for adjustment of spring biased force on lever arms connected to coil packers and the tool bar which results in greater or lesser weight transfer from the wheels to the coil packers. In this way, packing achieved by the various packers is adjusted so it is uniform for the implement as a whole and sufficient to eliminate packing discontinuities due to individual wheels.

These features are more fully described hereinafter with reference to the drawings.

BRIEF DESCRIPTION OF THE DRAWINGS

FIG. 4 is a cross-sectional view taken along line 4—4 of FIG. 3; and

FIG. 5 is an exploded perspective view of the spring bias mechanism.

DETAILED DESCRIPTION OF THE PREFERRED EMBODIMENT

Figure 1:
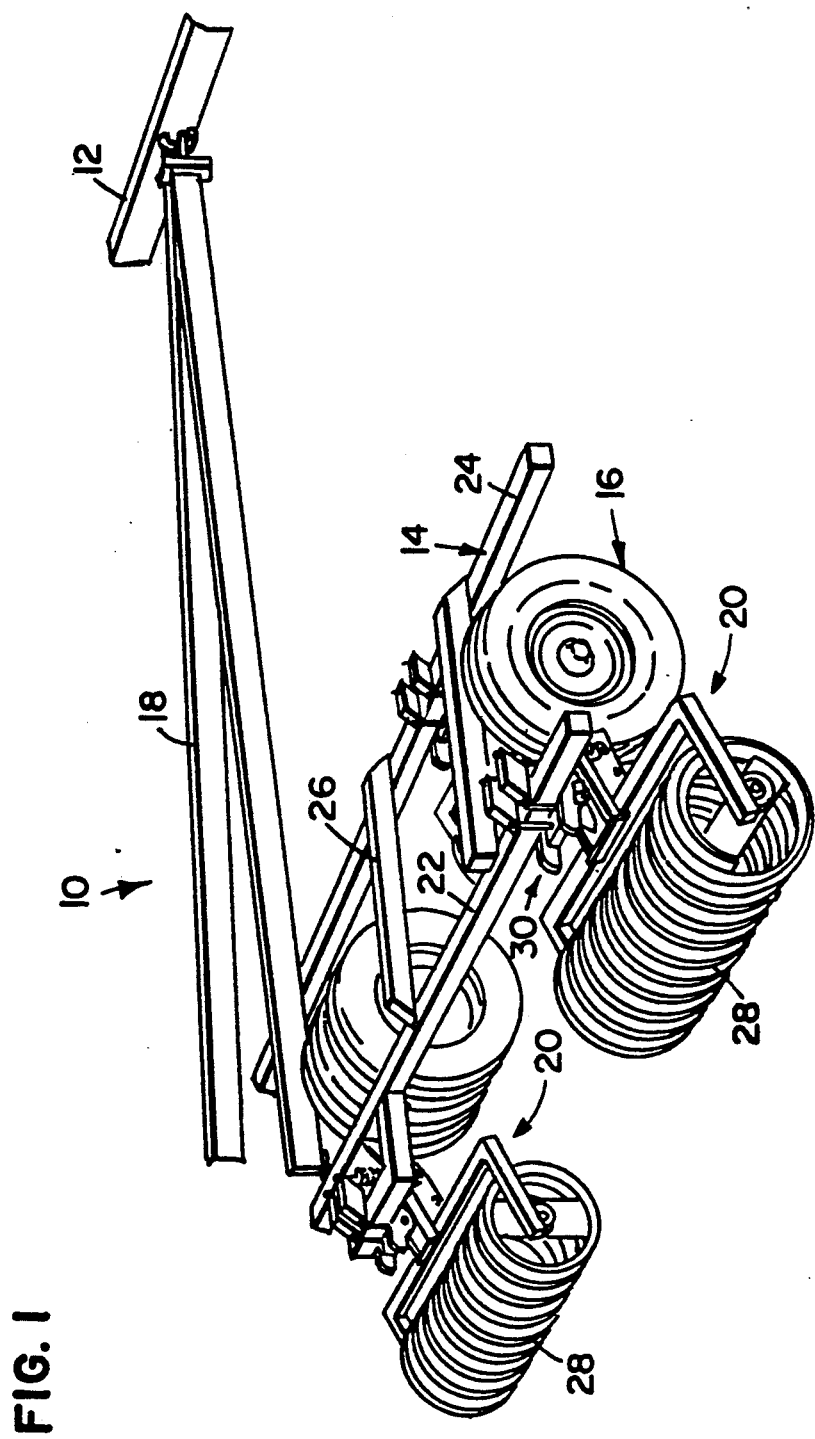
FIG. 1 is a perspective view of a portion of a packer implement in accordance with the present invention.

Referring then to the drawings wherein like reference numerals designate identical or corresponding parts throughout the several views, and more particularly to FIG. 1, a drawbar packer agricultural implement in accordance with the present invention is designated generally by the numeral 10. Apparatus 10 is adapted for connection to a towing vehicle, as illustrated by the numeral 12, to be pulled thereby providing forward movement over soil being prepared for planting or post planting. Apparatus 10 includes a frame 14 having a plurality of wheel assemblies 16 operably connected thereto. A towbar assembly 18 extends from frame 14 to towing vehicle 12. Coil packers 20 are operably connected to tool bars 22 and 24 which form a part of frame 14.

Frame 14 comprises a pair of space-apart bars 22 and 24 running transverse to the direction of travel of implement 10. A plurality of members 26 are attached to and extend between bars 22 and 24 to provide a rectangular frame work.

Towbar assembly 18 comprises a pair of beams which are attached together near a hitch assembly connected to towing vehicle 12 and which separate as they extend away from the hitch assembly for attachment to bars 22 and 24 of frame 14.

Wheel assemblies 16 are attached to frame 14 in a known fashion using a dependent bracket in conjunction with bearings, axles, wheels, and appropriate connecting and other hardware. Wheel assemblies 16 may be connected to any part of frame 14 as appropriate, including bar 24 and members 26 as shown in FIG. 1.

Coil packer assemblies 20 include coil packers 28 attached through a connecting assembly 30 to one of bars 22 or 24. Coil packers attached to tool bar 22 trail the wheels of the various wheel assemblies as shown. It is understood, however, that coil packers may also be attached to bar 24 to allow the arrangement of coil packers between the wheel assemblies and between the coil packers trailing the wheel assemblies thereby providing full packing coverage as the implement is pulled.

Figure 2:
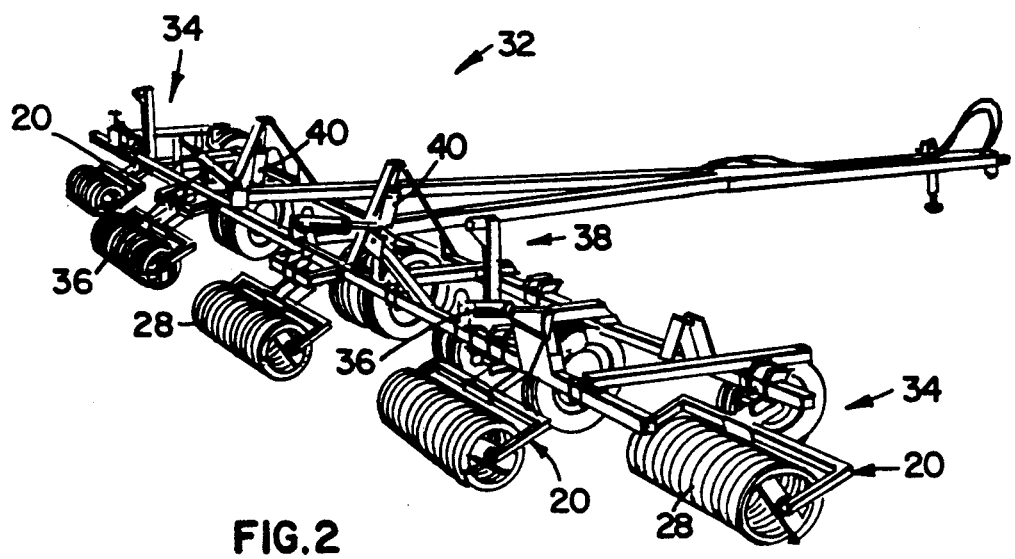
FIG. 2 is a perspective drawing of an alternate embodiment packer implement.

Implement apparatus 32 shown in FIG. 2 is larger than apparatus 10 and includes wing portions 34, but otherwise is constructed similarly. An hydraulic system is provided including hydraulic cylinder assemblies 36 which function to lift wing portions 34 relative to center portion 38. Additionally, cylinder assemblies 40 provide elevation for the entire frame relative to the central wheel assemblies. The present invention is equally applicable to an implement either having or not having wing portions.

Figure 3:
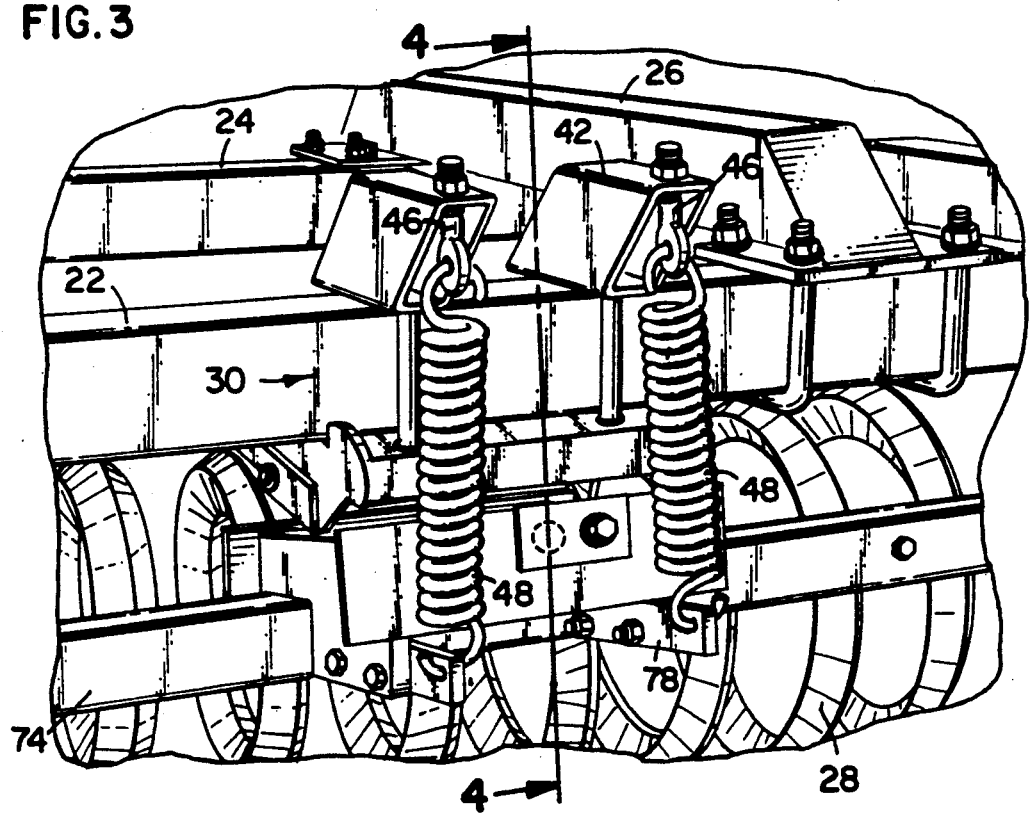
FIG. 3 is a perspective view showing generally the front of the spring bias mechanism.

The coil packer connecting assemblies 30 are shown in more detail in FIGS. 3-5. A box-section beam 42 cut at angles to provide from a side view a parallelogram outline is attached with bolts 44 to tool bar 22. Beam 42 overhangs tool bar 22 on the side spaced from tool bar 22 to provide an appropriate attachment surface for eye bolts 46 which are connected to one end of springs 48. In addition to attaching box-section beam 42 to the upper side of tool bar 22, bolts 44 also attach upper bracket 50 of swivel assembly 52 to the lower side of tool bar 22. Swivel assembly 52 further includes a lower bracket 54 attached to pull frame 56 and includes a swivel base 58 with appropriate connecting pins to allow the swivel motion between the brackets.

Upper bracket 50 is shown most clearly in FIG. 5. Upper bracket 50 comprises a base plate 60 with end plates 62 attached thereto at opposite ends. Side plates 64 extend between end plates 62 and along base plate 60. End plates 62 extend above and below base plate 60. The portion above includes a notch 66 for receiving tool bar 22 as shown more clearly in FIG. 4. When tool bar 22 is fitted in the notches, base plate 60 is adjacent tool bar 22 and held there by bolts 44 which pass through base plate 60 at openings 68.

Lower bracket 54 is attached to pull frame 56. Lower bracket 54 forms a box-like structure including a pair of plates 70, 72 extending parallel to square tubing 74 of pull frame 56. Square tubing 74 is also substantially parallel with tool bar 22 as seen in FIG. 4. A second pair of plates 76 extend between plates 70 and 72 and transverse to tubing 74. Plates 76 are welded or otherwise attached to tubing 74. The upper edges of plates 76 include a partially cylindrical cut-out to receive tube 84 of swivel base 58. Plates 76 extend outwardly from tubing 74 and beneath plate 70 sufficiently far to allow attachment of arms 78 which provide a lower connection for springs 48. An arm 78 is attached with a pair of nut and bolt combinations 80 to each plate 76. The unattached ends of arms 78 each have an opening 82 for receiving the lower end of a spring 48.

Swivel base 58 is the connecting element between upper and lower brackets 50 and 54. Swivel base 58 comprises upper and lower tubes 84 and 86, respectively, which are arranged orthogonal to one another and separated by plate 88. Tube 84 aligns with openings 90 in end plates 62. Pin 92 extends through openings 90 and tube 84 to provide a pivotal axle. A tab 94 is attached to pin 92 and also to one of end plates 62 with a screw 96 to retain pin 92 in place. Similarly, tube 86 is aligned with openings 98 just above tubing 74 in plates 70 and 72. Pin 100 extends through openings 98 and tube 86. Pin 100 is retained in place by tab 102 which is attached to pin 100 and by screw 104 to plate 70.

Pull frame 56 comprises transverse square tubing 74 and generally longitudinal square tubing 106 extending generally perpendicular rearwardly from transverse tubing 74. Retaining assemblies 108 attach to rods 106 and rotatably hold coil packer 28. Assembly 108 is conventional.

In use, drawbar packer apparatus 10 is pulled behind a tractor or other towing vehicle 12. To avoid wheels 16 from supporting weight which would cause them to pack the soil more than coil packers 28, assemblies 30 are adjusted so that the weight of the framework of the implement is split between the coil packers and the wheels such that the wheels pack soil somewhat less than the coil packers pack it, thereby assuring uniform packing.

Assembly 30 allows a coil packer 28 to pivot about pin 100 which defines an axis along the direction of travel. Assembly 30 also allows a coil packer 28 to pivot about pin 92 which defines an axis transverse to the direction of travel. Springs 48 are on a side of the pivot connection opposite from the coil packer. The springs are biased to force the coil packer toward the soil. In this way, as the nut on eye-bolt 46 is adjusted, the biasing force of the springs is changed thereby changing the transfer of weight from the wheels to the coil packers. When eye-bolt 46 is loosened, the tension on spring 48 decreases so that the force with which coil packer 28 is pressed toward the soil decreases. In this way, less weight is transferred from the wheels to the coil packers. When the nut on eye-bolt 46 is tightened, the tension on coil springs 48 increases causing a levering action about pin 92 which forces coil springs 28 into the soil to a greater degree thereby transferring more weight from the wheels to the coil packers.

It is understood that the present invention is also accomplished by positioning springs in compression on the same side of the axis transverse to the direction of travel as coil packers 28. Structure similar to beam 42 could extend toward the coil packer and a compression spring could fit between such structure and tubing 74 or some similar framework connected to the coil packer. In the same fashion as eye-bolt 46 provides adjustment for tension spring 48, an eye-bolt could be reversed from that of eye-bolt 46 and further compress a compression spring thereby providing necessary adjustment. Rather than lifting the end of the lever on the opposite side of the pivot as the coil packer as shown in the FIGURES, as indicated the invention thus also contemplates forcing the lever downwardly in a region between the pivot and the coil packer.

Drawbar packer 32 functions similar to implement 10 and is actually the preferred machine since it includes an hydraulic system for elevating the coil packers to provide for transport. Hydraulic cylinder assemblies 36 fold the wing portions, while hydraulic cylinder assemblies 40 raise the coil packers of the central portion relative to the wheels.

The present invention solves the problem of uneven packing due to too much weight being supported by wheels of an implement of the present type. As a result, a seed bed is prepared uniformly and crop is allowed to germinate and grow uniformly resulting in greater yield.

Thus, the preferred and an alternate embodiment of apparatus in accordance with the present invention have been described in detail. In this regard, it is understood, however, that the disclosure is exemplary and that equivalents are possible. Therefore, it is further understood that changes made, especially in matters of shape, size, and arrangement to the full extent extended by the general meaning of the terms in which the appended claims are expressed, are within the principle of the invention.

What is claimed is:

1. An agricultural implement adapted for connection to a towing vehicle for forward movement over soil, said implement comprising:
   a frame with a plurality of wheels operably connected thereto, said frame including a tow bar adapted for connection to said towing vehicle, said frame also including a tool bar, said wheels supporting weight of said implement;

a plurality of packer tools and a plurality of means for connecting each of said packer tools to said tool bar, each of said connecting means including a lever arm and a swivel base through which said lever arm is connected to said tool bar, said swivel base allowing said packing means to tilt transversely and to adjust elevationally with respect to said tool bar, said connecting means further including a spring biased to force said packer tool toward the soil, said spring being attached at a first end of said lever arm on one side of said tool bar, said packer being attached at a second end of said lever arm on a side opposite said one side of said tool bar.

* * * * *